Oct. 23, 1951　　　J. E. CAMPBELL　　　2,572,315
DEHYDROHALOGENATED POLYVINYL CHLORIDE POLARIZER
Filed Feb. 24, 1949
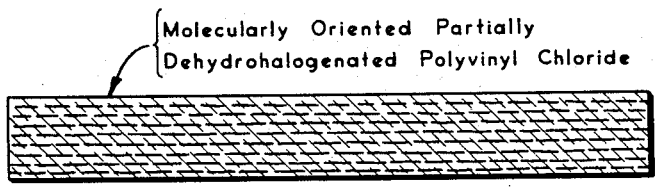
INVENTOR
John E. Campbell
BY Donald L. Brown
Attorney Patented Oct. 23, 1951

2,572,315

UNITED STATES PATENT OFFICE 2,572,315

DEHYDROHALOGENATED POLYVINYL CHLORIDE POLARIZER

John E. Campbell, Cambridge, Mass., assignor to Polaroid Corporation, Cambridge, Mass., a corporation of Delaware Application February 24, 1949, Serial No. 78,092

4 Claims. (Cl. 88—65)

This invention relates to a new and improved light-polarizing material.

An object of the invention is to provide a dichroic, light-polarizing sheet comprising, essentially, molecularly oriented, dehydrohalogenated polyvinyl chloride.

Other objects of the invention are to provide a process for the manufacture of a dichroic light polarizer of the character described, wherein a sheet of polyvinyl chloride is heavily plasticized, imbibed in a bath comprising a swelling agent or solvent, a conversion agent and a diluent, subjected to a stretch to substantially orient the molecules of the sheet, and then heated until there has been formed in the sheet by the partial dehydrohalogenation thereof a dichroic reaction product which renders the sheet light polarizing.

Still further objects of the invention are to provide light-polarizing sheets or films of the character described which show throughout substantially all of the visible spectrum, and particularly throughout that portion lying between 450 millimicrons and 650 millimicrons, usable dichroic ratios of the order of 7 or higher; and to provide such light-polarizing sheets or films which are stable, durable, easily handled, readily laminated and easily manufactured.

Other objects of the invention will in part be obvious and will in part appear hereinafter.

The invention accordingly comprises the product possessing the features, properties and the relation of elements which are exemplified in the following detailed disclosure, and the scope of the application of which will be indicated in the claims.

For a fuller understanding of the nature and objects of the invention reference should be had to the following detailed description taken in connection with the accompanying drawing which is a diagrammatic view in section of a sheet comprising a preferred embodiment of the invention.

The present invention contemplates the provision of light-polarizing sheets or films by the partial dehydrohalogenation of molecularly oriented sheets of polyvinyl chloride and copolymers thereof with small amounts of other materials such, for example, as vinylidene chloride or vinyl acetate. Materials such as the commercially available resins comprising about 80% or more polyvinyl chloride and about 20% or less polyvinyl acetate or polyvinylidene chloride are suitable for use in the practice of the present invention, as are the 100% vinyl chloride resins commercially obtainable.

In the practice of the invention a relatively highly plasticized sheet comprising polyvinyl chloride is prepared, for example, by casting a mixture or dope comprising polyvinyl chloride and a relatively large percentage of plasticizer in an adequate quantity of solvent for polyvinyl chloride to form a film of the order, for example, of five thousandths of an inch in thickness. A suitable dope or mix for casting may comprise 300 cc. of tetrahydrofuran as the solvent or swelling agent; 45 grams of a commercially available polyvinyl chloride resin; and 40 cc. of dioctyl phthalate as the plasticizer. The proportion of plasticizer to polyvinyl chloride may be widely varied, and other suitable plasticizers may be employed. The plasticizer should be compatible with the polyvinyl chloride so that a homogeneous blend may be obtained; it should be efficient to insure resilience and to permit elongation of the cast sheet with a minimum quantity of plasticizer content; it should not be readily volatile under the conditions to which the sheet is subjected in the practice of the process of the invention; and it should be stable toward alkali particularly, to prevent degradation of the cast sheet in the conversion bath to which it is subjected.

Other desirable properties of the plasticizer are resistance to ultraviolet radiation, resistance to water, inflammability, low temperature flexibility, freedom from odor, nontoxicity, good color properties and oil resistance. The primary requisites, however, are that it must permit adequate elongation of the cast sheet, i. e., elongation preferably in excess of five times its initial cast length, with good optical properties in the final sheet and stability in the plasticizer toward the alkali conversion bath. Satisfactory results have been obtained not only with dioctyl phthalate but also with dioctyl sebacate, dibutyl sebacate, Santicizer B-16 (butyl phthalyl butyl glycolate), tricresyl phosphate, triglycol ester and butoxy ethyl phthalate; dioctyl phthalate and dioctyl sebacate are somewhat preferred.

Various proportions of plasticizer to polyvinyl chloride may be employed. The cast sheet should contain enough plasticizer to permit extension after reaction in the bath hereinafter described to at least about five times its initial cast length. Preferably the plasticizer content of the cast sheet should be between about 40% and 100% by weight of resin employed.

The plasticized polyvinyl chloride sheet is then imbibed in a fresh bath comprising a vinyl chloride solvent, an alkali conversion agent and a diluent. A suitable bath may comprise, for example, 100 cc. of tetrahydrofuran as the solvent;

50 cc. of Solox as the diluent; and 25 cc. of Triton B, a 40% solution of benzyl trimethyl ammonium hydroxide in water, as the conversion agent. The plasticized sheet may be imbibed in the foregoing bath at room temperature for about three minutes, the bath being gently agitated so as to prevent the formation of wrinkles in the sheet and to keep the sheet from making contact with the bottom of the pan, which might give rise to uneven conversion results. The sheet is then removed from the bath and excess solution removed by drying. It is to be understood that other vinyl chloride solvents may be satisfactorily employed in the treating bath as for example methyl isobutyl ketone, methyl ethyl ketone or cyclohexanone, and many other alcohols are usable as diluents. Moreover, other alkali conversion agents such, for example, as sodium hydroxide or potassium hydroxide may be satisfactorily employed. The proportions given of the various ingredients of the treating solution are not critical, and may be departed from without impairing the process of the invention.

After treatment in the conversion bath the alkali-imbibed, plasticized polyvinyl chloride sheet is heated and stretched to substantially orient the molecules of the sheet. Satisfactory results have been obtained where the sheet has been stretched to approximately five times its initial cast length. Where practical, still further extension may be imparted to the sheet with improved results. The stretched sheet is then placed in an oven and, while held under tension in its stretched condition, is heated at a temperature, for example, of approximately 140° C. until the desired dehydrohalogenation or conversion to the dichroic polarizing material takes place. Suitable conversion is accomplished by heating a sheet of the character described at the specified temperature for approximately fifteen to twenty minutes. Excessive conversion of the sheet should be avoided as it may give rise to the formation of a substantially opaque product.

The partially dehydrohalogenated sheet is then cooled while held under tension to prevent relaxation. The term "partially dehydrohalogenated" as employed in the specification and claims is intended to mean the partial or incomplete removal from the sheet of polyvinyl chloride of hydrogen and chlorine to an extent only, however, such that there is produced in the sheet of polyvinyl chloride dichroic light-polarizing material consisting of these molecules or those portions of the molecules of the sheet from which the hydrogen and chlorine have been driven.

The resulting product is a dichroic light polarizer of a slightly bluish or purplish color which shows good dichroism, for example a dichroic ratio of the order of 7 or better throughout at least that portion of the visible spectrum lying between 450 millimicrons and 650 millimicrons. The sheet is tough, pliable, resilient, of optically high quality, smooth, transparent and durable. It may be readily laminated between plates of glass or other protective media if desired, by employing as the adhesive any suitable transparent plastic such, for example, as butacite and effecting the lamination by heat and pressure. The treated sheet still retains some plasticizer although an appreciable quantity of the plasticizer initially introduced into the cast sheet has been driven off by the conversion treatment. Where the sheet is of the order of .005 inch in thickness before stretching, the process to which it has been subjected results in the conversion of the surface layers only of the sheet. The central portion of the sheet remains substantially unconverted and essentially highly plasticized polyvinyl chloride. Thinner sheets or films may be so treated as to be substantially completely converted into the partially dehydrohalogenated, dichroic, molecularly oriented polarizer described above. All such products are to be deemed to fall within the invention.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. A transparent dichroic light-polarizing sheet comprising molecularly oriented polyvinyl chloride having incorporated therein a plasticizer from the class consisting of the high-boiling point esters which are compatible with and retained by polyvinyl chloride, said plasticized molecularly oriented polyvinyl chloride containing molecularly oriented, dichroic, partially dehydrohalogenated polyvinyl chloride, the ratio of plasticizer to polyvinyl chloride in said sheet being at least 2 to 5 by weight, said plasticizer retaining its plasticizing properties when subjected to a strongly alkaline solution, the dichroic ratio of said sheet for radiation in the wavelength band between 450 and 650 millimicrons being at least 7, and the dichroic properties of said sheet deriving essentially from the partially dehydrohalogenated polyvinyl chloride therein.

2. The product of claim 1 wherein the molecularly oriented, partially dehydrohalogenated polyvinyl chloride is substantially uniformly distributed adjacent the surface of said sheet.

3. A light-polarizing sheet as defined in claim 1 wherein the plasticizer is dioctyl phthalate.

4. A light-polarizing sheet as defined in claim 1 wherein the plasticizer is dioctyl sebacate.

JOHN E. CAMPBELL.

REFERENCES CITED

The following references are of record in the file of this patent:

UNITED STATES PATENTS

| Number | Name | Date |
|---|---|---|
| 2,060,035 | Chaney | Nov. 10, 1936 |
| 2,123,902 | Land | July 19, 1938 |
| 2,307,157 | Quattlebaum | Jan. 5, 1943 |
| 2,405,008 | Berry et al. | July 30, 1946 |

OTHER REFERENCES

Dinsmore article in Chemical and Engineering News, volume 21, No. 21, November 10, 1943, published by American Chemical Society, Easton, Pa., page 1800 cited.